US011755737B2

(12) United States Patent
Schanche et al.

(10) Patent No.: US 11,755,737 B2
(45) Date of Patent: *Sep. 12, 2023

(54) REPORTING AND CONFIGURATION ENHANCEMENTS OF ON-BOARD CERTIFIED SOFTWARE

(71) Applicant: General Electric Company, Schenectady, NY (US)

(72) Inventors: Kristin M. Schanche, Fairfield, OH (US); Matthew W. Wiseman, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 487 days.

This patent is subject to a terminal disclaimer.

(21) Appl. No.: 16/835,134

(22) Filed: Mar. 30, 2020

(65) Prior Publication Data

US 2020/0311276 A1    Oct. 1, 2020

Related U.S. Application Data

(60) Provisional application No. 62/826,916, filed on Mar. 29, 2019.

(51) Int. Cl.
*H04L 9/06* (2006.01)
*G06F 21/57* (2013.01)
(Continued)

(52) U.S. Cl.
CPC ............ *G06F 21/57* (2013.01); *B64D 45/00* (2013.01); *G06F 9/3836* (2013.01); *G07C 5/008* (2013.01); *H04W 76/12* (2018.02); *H04L 9/0643* (2013.01)

(58) Field of Classification Search
CPC . G06F 21/57; G06F 21/64; G06F 8/65; G06F 8/70; G06F 9/3836; G08G 5/0013;
(Continued)

(56) References Cited

U.S. PATENT DOCUMENTS 6,671,589 B2    12/2003    Holst et al.
6,816,728 B2    11/2004    Igloi et al.
(Continued)

OTHER PUBLICATIONS

David L. Moreno et al., TM/TC Encryption Systems, May 16-20, 2016, [Retrieved on Jun. 6, 2022]. Retrieved from the Internet: <URL : https://arc.aiaa.org/doi/pdf/10.2514/6.2016-2330> 5 Pages (1-5) (Year: 2016).
(Continued)

*Primary Examiner* — Amare F Tabor
(74) *Attorney, Agent, or Firm* — WOOD IP LLC

(57) ABSTRACT

Provided is a method for remotely communicating a software management task to certified software from a source to a software management module on an asset via a wireless communications link. The method includes encrypting the communications link between the source and the software management module to form a secure tunnel and verifying credentials of the source via the software management module when a software management task file is communicated. A load assurance check is performed on a portion of the communicated software management task file to confirm integrity of the communicated file when the credentials of the source are verified. Thee software management task is executed immediately when the file integrity is verified, the executing occurring automatically and being devoid of human intervention.

20 Claims, 10 Drawing Sheets

(51) Int. Cl.
  *H04W 76/12* (2018.01)
  *B64D 45/00* (2006.01)
  *G06F 9/38* (2018.01)
  *G07C 5/00* (2006.01)

(58) Field of Classification Search
  CPC ....... G07C 5/008; H04W 76/12; B64D 45/00; H04L 63/123; H04L 63/126; H04L 63/0428; H04L 9/0643
  USPC .......................................................... 726/22
  See application file for complete search history.

(56) References Cited

U.S. PATENT DOCUMENTS

| | | | |
|---|---|---|---|
| 7,489,992 | B2 | 2/2009 | Valette et al. |
| 7,636,568 | B2 | 12/2009 | Gould et al. |
| 7,779,478 | B2 * | 8/2010 | Ivanov .................. G06F 21/125 |
| | | | 726/22 |
| 7,908,042 | B2 | 3/2011 | Brinkley et al. |
| 8,136,149 | B2 * | 3/2012 | Freund ................ H04L 63/0227 |
| | | | 726/4 |
| 8,549,270 | B2 | 10/2013 | Gobbo et al. |
| 9,008,868 | B1 | 4/2015 | Bantoft et al. |
| 9,350,708 | B2 * | 5/2016 | Wong .................. H04L 63/0428 |
| 9,467,446 | B2 * | 10/2016 | Fausak .................. H04L 63/102 |
| 9,576,404 | B2 | 2/2017 | Ziarno et al. |
| 9,792,459 | B2 * | 10/2017 | Forsberg ................ G06F 21/60 |
| 9,954,967 | B1 | 4/2018 | Gheorghe et al. |
| 10,015,281 | B2 | 7/2018 | Santoso et al. |
| 10,470,114 | B2 | 11/2019 | Lee et al. |
| 11,023,578 | B2 * | 6/2021 | Marcourt .............. G06F 21/577 |
| 2004/0056766 | A1 | 3/2004 | Butz et al. |
| 2009/0222497 | A1 * | 9/2009 | Ryan ........................ G06F 8/65 |
| 2010/0098243 | A1 | 4/2010 | Chopart |
| 2011/0085667 | A1 * | 4/2011 | Berrios .................. H04L 9/3249 |
| | | | 709/203 |
| 2011/0296186 | A1 * | 12/2011 | Wong .................. H04L 63/0428 |
| | | | 713/171 |
| 2012/0216286 | A1 | 8/2012 | Johnson et al. |
| 2013/0036103 | A1 | 2/2013 | Lawson et al. |
| 2013/0067450 | A1 | 3/2013 | Saugnac |
| 2013/0318357 | A1 | 11/2013 | Abraham et al. |
| 2015/0163206 | A1 * | 6/2015 | McCarthy ............ H04L 63/104 |
| | | | 726/4 |
| 2015/0356319 | A1 | 12/2015 | Kimberly |
| 2016/0007198 | A1 * | 1/2016 | Lacey ..................... H04W 4/14 |
| | | | 713/175 |
| 2016/0328978 | A1 | 11/2016 | Ramaker et al. |
| 2017/0187539 | A1 | 6/2017 | Thompson et al. |
| 2017/0308371 | A1 | 10/2017 | Cantaloube |
| 2020/0167472 | A1 * | 5/2020 | Hertenstein .......... H04L 9/0891 |

OTHER PUBLICATIONS

Extended European Search Report for EP Application No. 20162013.5 dated Aug. 18, 2020, 10 pages.
Extended European Search Report for EP Application No. 20162015.0 dated Aug. 19, 2020, 11 pages.
Richard V. Robison et al., Secure Network-Enabled Commercial Airplane Operations: IT Support Infrastructure Challenges, 2007, [ Retrieved on Jun. 6, 2022]. Retrieved from the internet: <URL: http://labs.ece.uw.edu/nsl/papers/CEAS-07.pdf> 6 Pages (1-6) (Year: 2007).

* cited by examiner

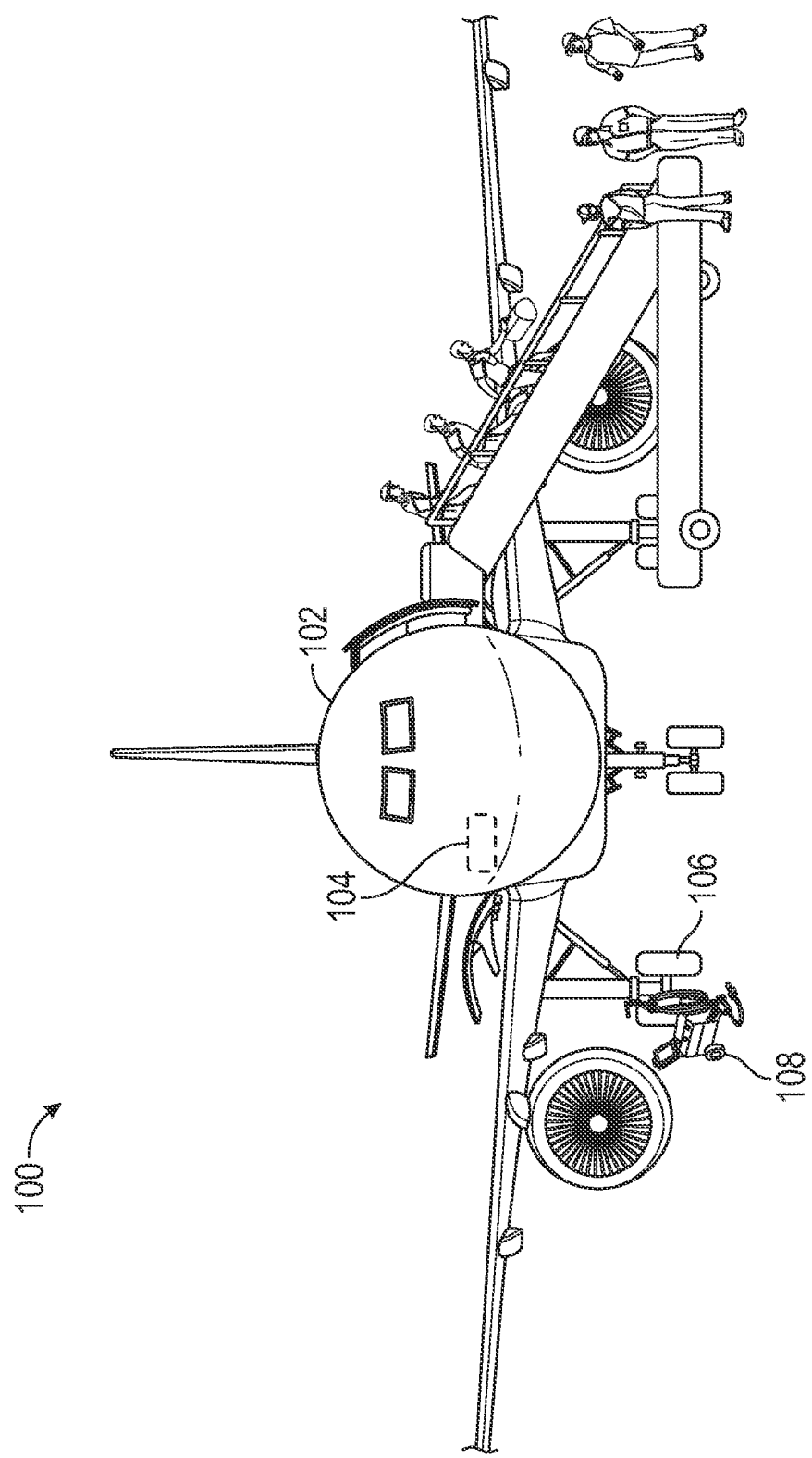
FIG. 1
(Conventional)

REPORTING AND CONFIGURATION ENHANCEMENTS OF ON-BOARD CERTIFIED SOFTWARE

I. TECHNICAL FIELD

The present invention relates to remotely updating and managing software. In particular, the present invention relates to wirelessly updating in managing executable files via a wireless link in a highly regulated environment without human intervention.

II. BACKGROUND

Historically, an original equipment manufacturer (OEM) or an asset industry owner, such as an airline, would initiate procedures to deploy new software to the asset. Depending on the level of criticality of the software, one step in the process requires a person (e.g., a human resource) to physically go to the airplane to manually install or release the software or provide permission to load it.

As understood by those of skill in the art, there are a variety of different approaches to transmitting new software to airplanes wirelessly using, for example, Wi-Fi, cellular, Bluetooth, optical, or the like. However, once the software has been transmitted to the airplane, it remains dormant until the human resource physically approaches the airplane and activates the software, causing it to begin executing. Thus, in conventional systems, the human resource remains in the loop. Accordingly, new software deployment in an airplane is a very manually driven process requiring the customer or another person, to directly interact with the airplane.

As aircraft utilization (flying time versus ground time) steadily increases, the human resource obtaining the necessary access to the airplane can be problematic. Also, in some cases the human resource that has the required expertise and the authority to perform the software load could be in one place, with the software ready to upload, while the airplane could be in another place.

There is also a limit in the number of human resources that can perform the update. For example, sending one person to accurately update, and verify etc., a fleet of 100 airplanes can be challenging. Even assuming an adequate number of human resources updating the fleet of 100 airplanes, there are issues of latency. After the update has been ordered, an airline will want to synchronize the update throughout the whole fleet, to minimize operational differences between aircraft during the transition. However, because humans are still in the loop, realization of actual results will always be limited to the bandwidth of the number of people required to touch each of the aircraft being serviced.

As an example of a conventional software update based on a small sample of software-based systems, most commercial airplanes include a flight data recorder (FDR), and an aircraft communication and reporting system (ACARS), along with many other software-based line replaceable units (LRUs). Another commonly encountered system is the aircraft condition monitoring system (ACMS). Software updates can be transmitted by operator to these systems remotely. However, these software updates cannot be activated until maintenance personnel physically connect to each of the systems, or LRUs, in every airplane and initiate or execute the software. This update function may be performed using some type of ground support equipment (GSE) or using a built-in interface, such as a maintenance terminal.

FIG. 1 illustrates a conventional system 100 for transmitting and uploading executable software to an airplane 102 in a highly regulated environment. In FIG. 1, the airplane 102 includes an embedded LRU 104 scheduled to receive a software update. The LRU 104, for example, could be an ACMS configured to receive the software update. In the example of FIG. 1, the software update could include executable files wirelessly transmitted to the LRU 104 via a wireless link (not shown).

Although wirelessly transmitted, the software nonetheless remains inactive within the LRU 104. The human resource, such as maintenance person 106, must physically and manually activate the software via a mechanism, such as GSE 108. In the conventional system 100, the maintenance person 106 manually performs software load verification check, along with any other required software security procedures. Historically, there has always been a human on the airplane verifying the software load, running the software update and releasing the executable files.

III. SUMMARY

Given the aforementioned deficiencies, a need exists for methods and systems that facilitate the autonomous uploading of executable files into a system functioning in a highly regulated environment, such as a commercial airplane. More specifically, methods and systems are needed for a basic systemic structure to develop an application on a desktop and deploy it wirelessly to the highly regulated asset, such as an aircraft, for execution without human intervention. Methods and systems are also needed that allow an operator to remotely transmit software to an asset and initiate execution of the software completely autonomously, in real-time, with the appropriate level of security being provided to verify the software is coming from a trusted source.

Under certain circumstances, an embodiment of the present invention includes a method for remotely communicating a software management task to certified software from a source to a software management module on an asset via a wireless communications link. The method includes encrypting the communications link between the source and the software management module to form a secure tunnel and verifying credentials of the source via the software management module when a software management task file is communicated. A load assurance check is performed on a portion of the communicated software management task file to confirm integrity of the communicated file when the credentials of the source are verified. The software management task is executed immediately when the file integrity is verified, the executing occurring automatically and being devoid of human intervention.

As understood by those of skill in the art, the term regulated asset may apply to a number of different types of devices in various industry sectors. For example, the Department of Homeland Security has identified 16 critical infrastructure sectors, one being the transportation sector. The airline industry is one industry within the transportation sector. Invention, or embodiments thereof, may also apply to other industries within the transportation sector, such as autonomous vehicles. Embodiments of the invention, however, may also apply to other critical infrastructure sectors entirely, such as the energy sector (e.g., power generation), and the healthcare sector (e.g., medical equipment), to name a few.

A commercial airplane is the most highly regulated assets in perhaps the most highly regulated environment in the world, in which the public participates on a day-to-day basis.

The average airplane includes a plurality of software-based systems that require periodic updating the software.

By way of example, the ACMS on-board the airplane monitors critical parameters and anomalies output from aircraft engines, flight control systems, and electrical power systems etc. The ACMS performs a limited amount of processing, based on these monitored systems, and creates reports that are transmitted from the airplane summarizing the airplane's behavior. There are various types of ACMSs, ACMS software platforms, and vendors.

In a conventional ACMS, if an operator desired a new type of report, the operator is required to submit a request to the vendor, or an avionics provider, requesting the new report. The new report, for example, can request that existing data be processed in some new or unique way. Only the vendor would possess the tools and skills to rewrite the software to modify the report and upload the new software into the ACMS.

The embodiments of the invention, however, can function using either OEM-provided software for conventional aircraft computing systems, like ACMS or aircraft critical control functions, or hosted applications developed using any object-oriented, high-level programming language suitable for developing desktop and/or web-based applications that can be hosted on a general computing platform or data processing module. Python is an example of one such modern programming language with broad familiarity in airline or airframe information technology (IT) departments, and with software developers. Object-oriented, high-level programming languages typically support modularity and code readability. As such, with the level of modularity in the programming language and the level of automation built into the data update module, the operator, an airframer, or a system manager can create and deploy the new software or application.

Embodiments of the invention also have proper security features including trusted sources and load assurance checks. These features reduce the possibility of bad actors (e.g., passengers and/or other non-airline personnel) transmitting malicious software to trigger undesirable avionics consequences or influence other behaviors that could adversely affect aircraft performance.

Embodiments of the invention also expand the types of wireless mechanisms by which software updates can be transmitted to an asset. For example, in some cases only WiFi is available. In others, only cellular is available. The embodiments expand these mechanisms to any suitable wireless transmission medium.

Various aspects of the embodiments make equipment for updating and managing software more accessible, robust, and user friendly for both airlines and OEMs. In the embodiments, a software management module provides remote querying, equipment self-reporting, live config/creation of reports, and configurable error reports/log files sent automatically at connection, and during in-flight access. Features provided can be genericized for any equipment with need for remote update and management.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are for purposes of illustrating the embodiments and are not to be construed as limiting the disclosure. Given the following enabling description of the drawings, the novel aspects of the present disclosure should become evident to a person of ordinary skill in the relevant art(s).

FIG. 1 illustrates a conventional system for uploading executable software to an airplane.

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Embodiments of the present invention provide elements (a)-(f) below, discussed in greater detail herein in relation to FIGS. 1-7:

a. remote load and activation (no human at the asset);
b. option to be deployed by equipment provider;
c. leveraging wireless methods including RF or optical methods applicable to all design assurance levels (DALs), or similar regulatory design requirements;
d. includes both configuration content and executable software;
e. deployment of new software, updates, remote deactivation, and deletion;
f. security features to ensure updates originate from a trusted source; and
g. checksum or equivalent quality/load assurance checks onboard to confirm software load integrity.

Figure 2:
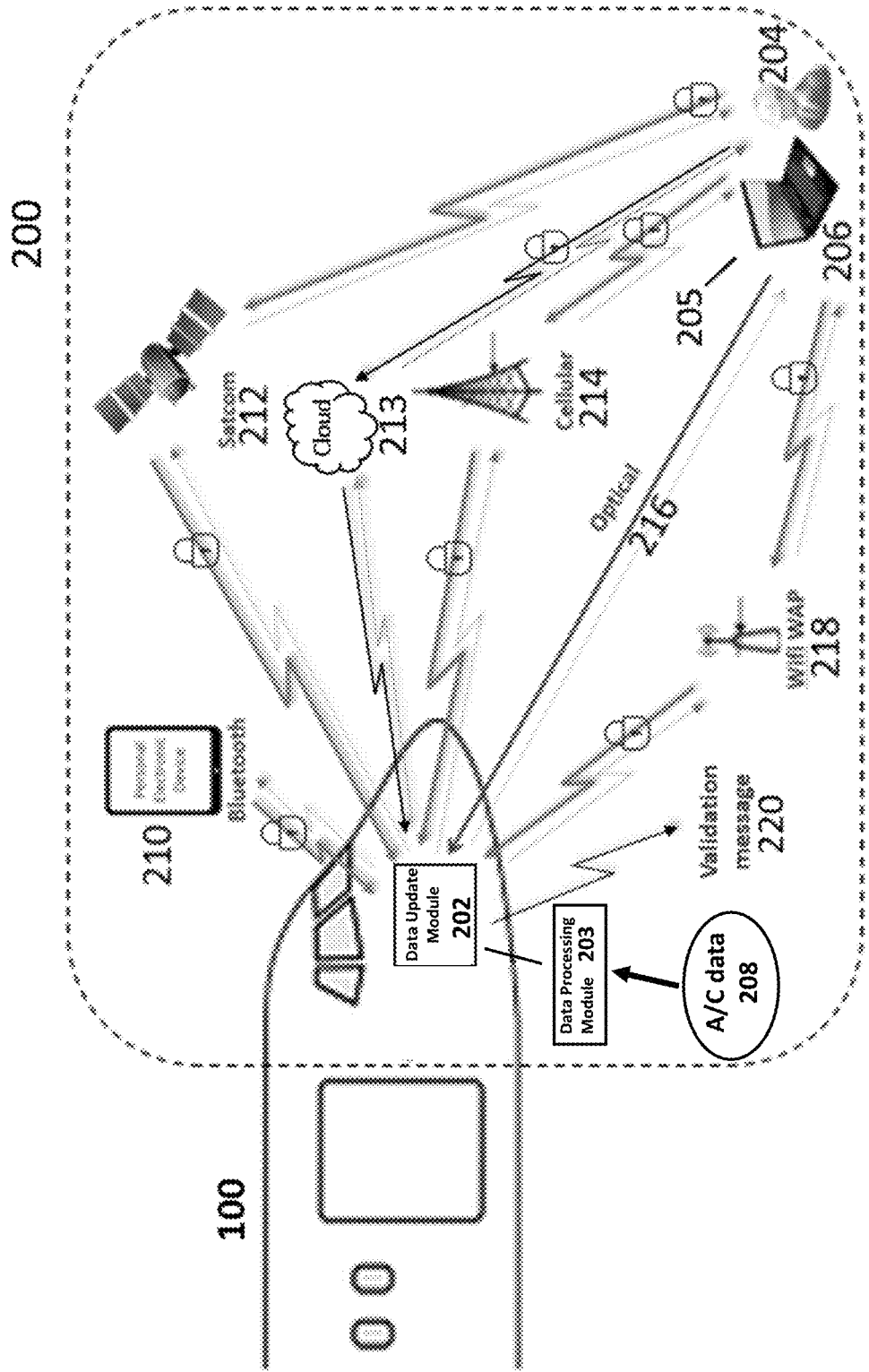
FIG. 2 illustrates a system constructed in accordance with embodiments of the present invention.

FIG. 2 is an exemplary illustration of a system 200 constructed and arranged in accordance with the embodiments. In FIG. 2, the airplane 100 of FIG. 1, has been upgraded to include the system 200 in accordance with the embodiments. The system 200 is configured to allow an operator to remotely transmit software to an asset, such as the airplane 100, and initiate execution of the software completely autonomously in real-time. In other words, the system 200 enables remote load and activation without human intervention, which is the ability to remotely send new software to the airplane 100 via wireless means and activate that software without requiring the human operator to physically go to the airplane 100.

The system 200 includes a data update module 202 configured to receive the uploading of executable files in the highly regulated FAA environment of the airplane 100. The system 200 permits a human operator 204, such as an OEM, an integrator (e.g., an airframer), a customer, a system manager or any of the authorized operators to create applications (or use third party applications) on a device, such as a laptop computer 205. The human operator 204 can transmit those applications to the data update module 202. The data update module 202 may be configured to work in conjunction with a data processing module 203 to receive and monitor critical aircraft systems data 208 (explained in greater detail below). In this example, the software update 206 change the manner in which the aircraft systems data 208 is analyzed or reported.

In the exemplary system 200, the human operator 204 has a large number of wireless communication paths through which to transmit the software update 206 to the data update module 202. By way of example, and not limitation, links such as Bluetooth 210, satellite radio frequency (RF) communications 212, cloud-based 213, cellular 214, optical communications 216, WiFi/wireless access point 218, and other suitable wireless means and standards, can be used to transmit the software update 206 to the data update module 202.

More specifically, in the exemplary system 200, the human operator 204 transmits the software update 206 to the update module 202. The software update 206 can include configuration data, content, and/or executable software, which could include applications, algorithms, or various functions. Configuration data and content have previously been transmitted to airplanes and uploaded/activated without user intervention, in limited circumstances. Executable software, however, has always required human intervention at the airplane to execute the software. The embodiments move executable software into the realm of excluding human intervention to automatically execute the software update 206 at the airplane 100.

Different types of digital information can be sent to the airplane 100 that may loosely fall within the category of software. Therefore, for purposes of clarity, configuration data, content, and executable software are clarified below within the context of the embodiments.

By way of example and not limitation, configuration data, within the context used herein, could include several types of reports generated by the airplane 100. The configuration would take one of these reports for autonomous transmission from the airplane 100 or for manual retrieval. Embodiments of the present invention would not impact the functionality or the content of these reports. Instead, with respect to configuration data, the embodiments function as a software switch, controlling whether the report will be transmitted from the airplane 100, or not.

An example of content, within the context of the embodiments, is a navigation database (NDB), or the like. The NDB, desirably includes elements from which flight plans are constructed and is typically updated every 28 days to ensure its contents are accurate. The NDB, formed of data in accordance with the ARINC 424 Navigation System Database Standard, is considered to be content that can be uploaded into the data update module 202 and passed to a target computing LRU for use.

Executable software is considered to be software performing mathematical calculations producing a result that can be accessed in a report or through some human interface. Embodiments of the present invention allow an operator to create, remotely deploy to the update module 202, and autonomously activate executable software in a data processing module 203 without the need for any human intervention.

Further, the software update 206 does not need to be new. Instead, the update 206 can be a new update to existing functions (e.g., new versions of existing software). That is, the update 206 can overwrite, or delete, older software.

The system 200 of FIG. 2, utilizing the wireless RF and optical communications methodologies, is applicable to all software criticality levels (A-E) associated with the D0-178 guidelines of the Airborne Systems and Equipment Certification process. These software criticality levels are often referred to as development assurance levels (DALs).

In another example, the data update module 202 can perform remote activation and deactivation. That is, the data update module 202 communicates to an application, currently running on the airplane 100, that the application may be temporarily deactivated and potentially reactivated at a later time. This feature can be useful, for example, when a user has been notified that an update has been performed but has reason to believe the update may be fraudulent or contain malicious code. The remote activation/deactivation enables the human operator 204 to deactivate the update until additional verifications can be performed.

Figure 3:
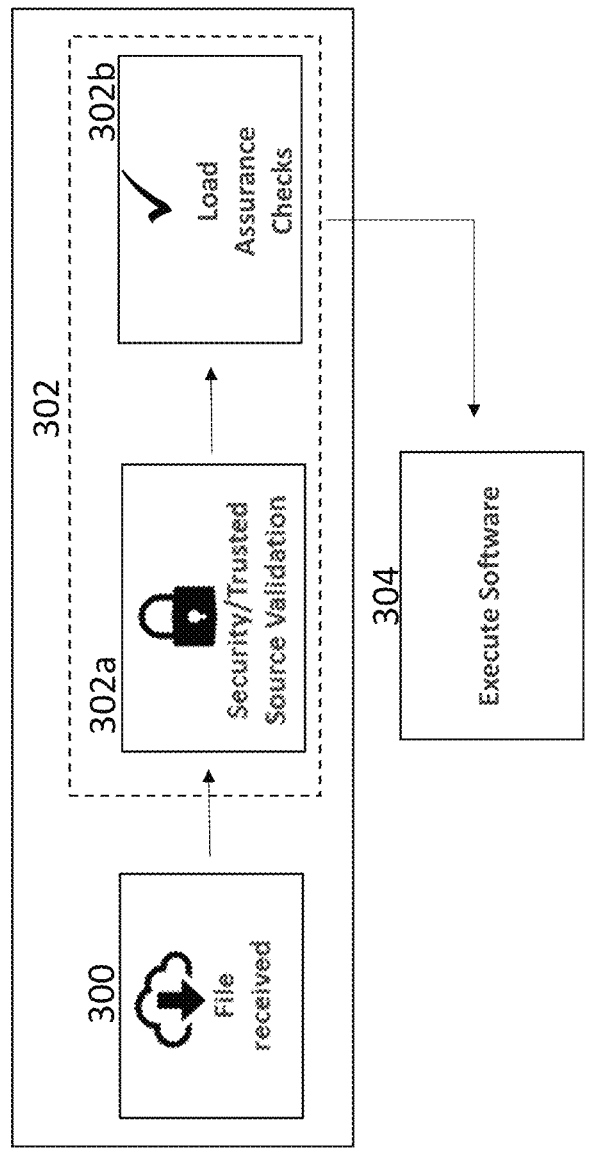
FIG. 3 illustrates the exemplary update module of FIG. 2 in greater detail in accordance with the illustrious embodiments.

FIG. 3 illustrates the exemplary data update module 202 of FIG. 2 in greater detail in accordance with the embodiments. The data update module 202 includes computer logic to perform the steps of receiving software update files 300, to execute a security check logic 302, and perform a software execute step 304.

In the embodiments, when wireless transmission of the software update 206 occurs, the update is received as an input to data update module 202, as verified by the file received logic step 300. If the source (i.e., the human operator 204) of the transmission passes proper security checks and is verified, the software update 206 security is verified and validated at the security check logic 302.

The security check logic 302 is performed to protect the airplane 100 from potentially catastrophic consequences of malicious software transmitted by nefarious actors. The security check logic 302 includes a security/trusted source validation sub-step 302a and a load assurance sub-step 302b, discussed in greater detail below. In the embodiments, the sequence of the security/trusted source validation sub-step 302a and the load assurance sub-step 302b can occur automatically, without a human intervening or being in the loop.

The security/trusted source validation sub-step 302a begins with reference to FIG. 2 and the data update module 202. Specifically, the data update module 202 on the aircraft 100 has a secure encrypted connection to the ground system, such as the laptop computer 205, the personal electronic device 210, and the cloud-based computing platform 213.

Each of the lightning bolts in FIG. 2 going to the airplane 100 that includes an image of a lock includes an end-to-end encryption from the corresponding ground system to the data update module 202.

This end-to-end encryption provides a secure tunnel through which the security/trusted source validation sub-step 302a of FIG. 3 can occur. The sub-step 302a provides the data update module 202 with the ability to verify that any source transmitting software to the aircraft 100 is authorized to do so and has the proper credentials to send software. By way of example, the authorized (i.e., proper) credentials (e.g., permissions) could be preloaded onto a storage device, similar to a subscriber identification module (SIM) card used in a cell phone. The SIM card like storage device could be plugged into the data update module 202 as part of its installation on the aircraft, so that the data update module 202 then can autonomously validate the origin of the software update.

The load assurance checks step 302b ensures the information (i.e., data update 206) initially transmitted to the data update module 202 was actually received. By way of example, load assurance checks can be implemented using a checksum, hash function, or some other type of digital data integrity verification function. A version of a cryptographic hash function could be calculated on a portion of the received software update 206 for comparison to a check value provided by the transmitting ground system, or source of the update.

The purpose of the comparison is to ensure the payload arrives with full integrity, and with no errors in the transmission. When the load assurance checks sub-step 302b has completed its operations and the load integrity is confirmed, a software execute command is issued within the update module 202, and the software update 206 immediately commences.

In the embodiments, the majority of the communication occurs from the ground (e.g., the human operator 204) to the aircraft 100, or from the personal device 210 to the aircraft 100, where new or updated software is being loaded. Alternative embodiments permit the data update module 202 on the aircraft 100 to optionally respond with a validation or acknowledgment message 220 that the software and that everything checked out.

Figure 4:
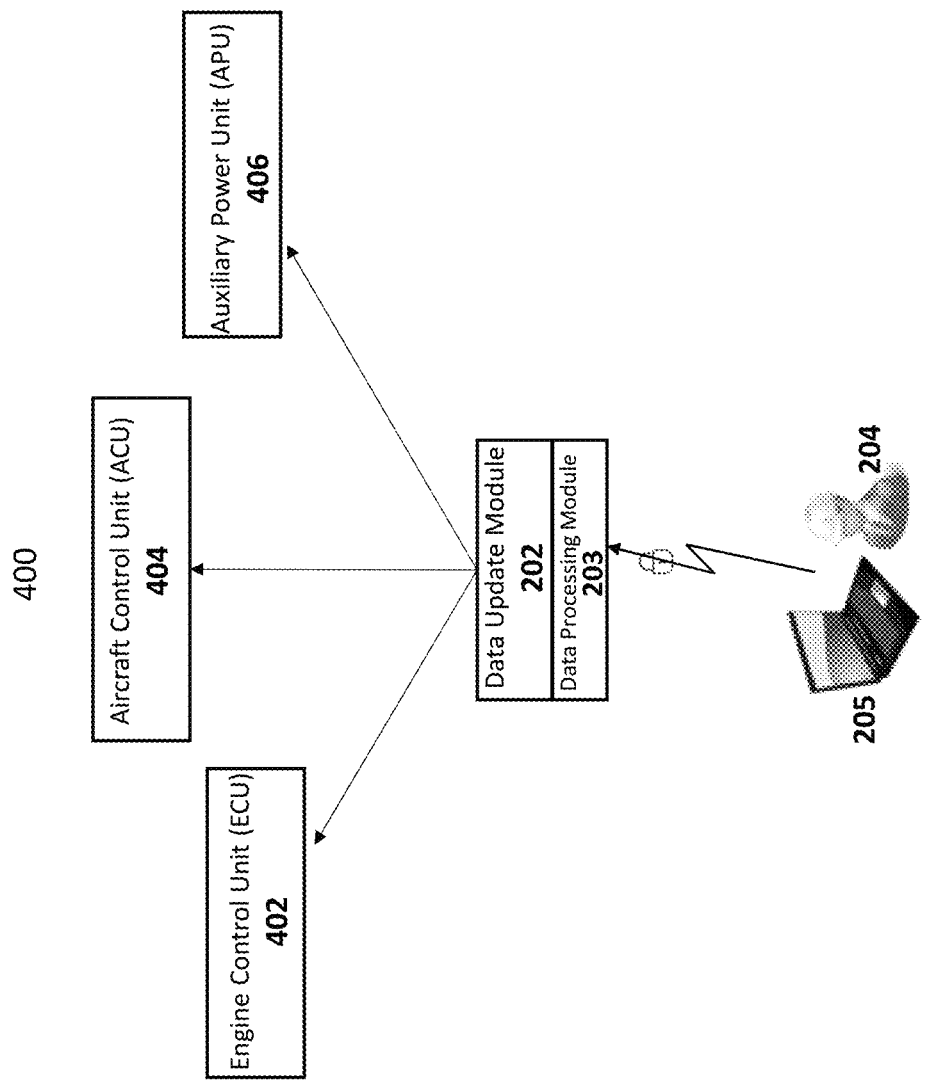
FIG. 4 illustrates an exemplary deployment of an embodiment of a single update module of the present invention in a hub configuration servicing three aircraft systems.

FIG. 4 illustrates an exemplary deployment 400 of an embodiment of a single update module of the present invention in a hub configuration. The exemplary deployment 400 is for purposes of illustration only, as the present invention is not limited to a single hub configuration. In FIG. 4, the exemplary deployment 400 is demonstrated using three of the most critical aircraft systems represented by: engine control unit (ECU) 402, aircraft control unit (ACU) 404, and auxiliary power unit (APU) 406.

In the exemplary deployment 400, the human operator 204, using the laptop computer 205, transmits a software update via a secure encrypted connection to data update module 202 (on the aircraft 100). In this example, the data processing module 203 and the data update module 202 act as a single hub, or a front-end, for all software updates sent to each of the ECU 402, the ACU 404 and the APU 406.

Figure 5:
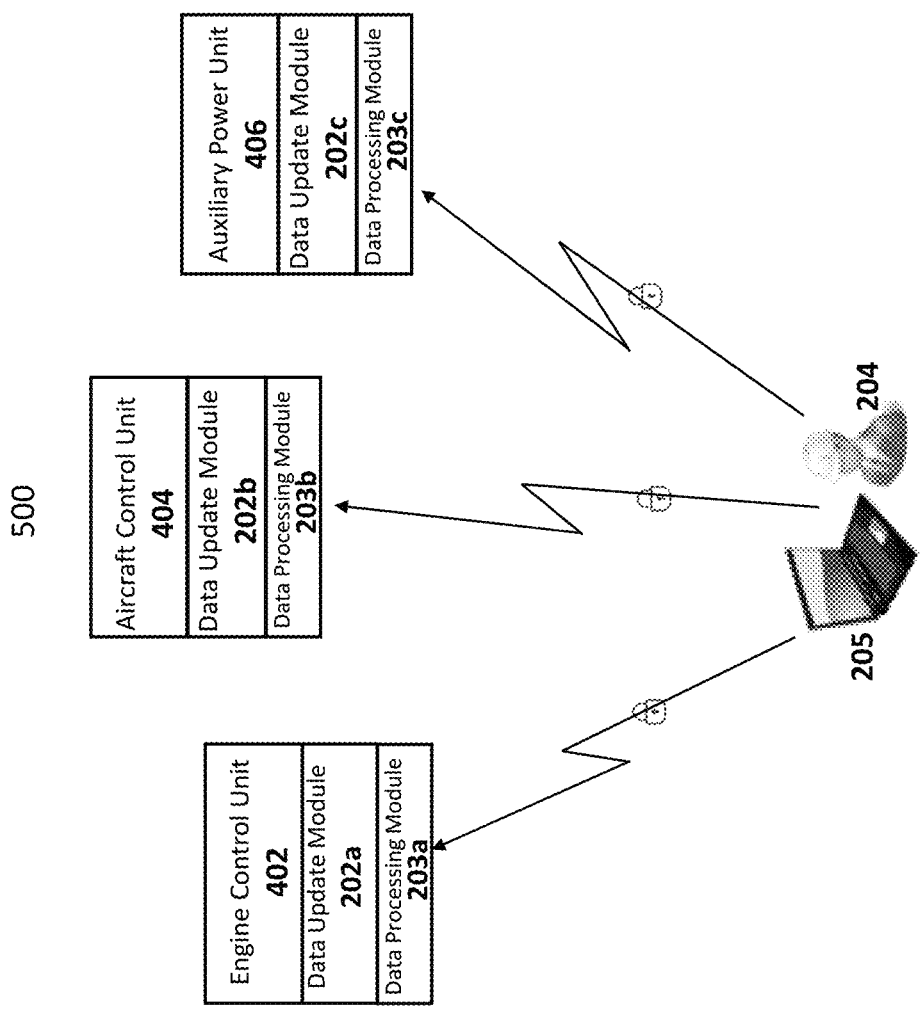
FIG. 5 illustrates an exemplary deployment of an alternative deployment of multiple update modules respectively coupled to multiple aircraft systems.

FIG. 5 is an exemplary illustration of a deployment 500 of an alternative deployment of multiple update modules respectively coupled to multiple aircraft systems.

The exemplary deployment 500 is similar to the deployment 400 of FIG. 4 and as such, the similarities will not be repeated here. In FIG. 5, the data update module 200 and the data processing module 203 of FIG. 4 are implemented three times (202a, 202b, 202c) and (203a, 203b, and 203c) to cover the three systems: the ECU 402, the ACU 404, the APU 406. Thus, in the deployment 500 the data update module 202a performs the file receiving, the source validation, the load assurance checks, and provides the pathway to the ECU 402. The data update module 202b performs the file receiving, the source validation, and the load assurance checks for the ACU 404. The data update module 202c performs the file receiving, the source validation, and the load assurance checks for the APU 406.

Many other implementations including various pluralities of the data update module 202 would be within the spirit and scope of the present invention.

Figure 6:
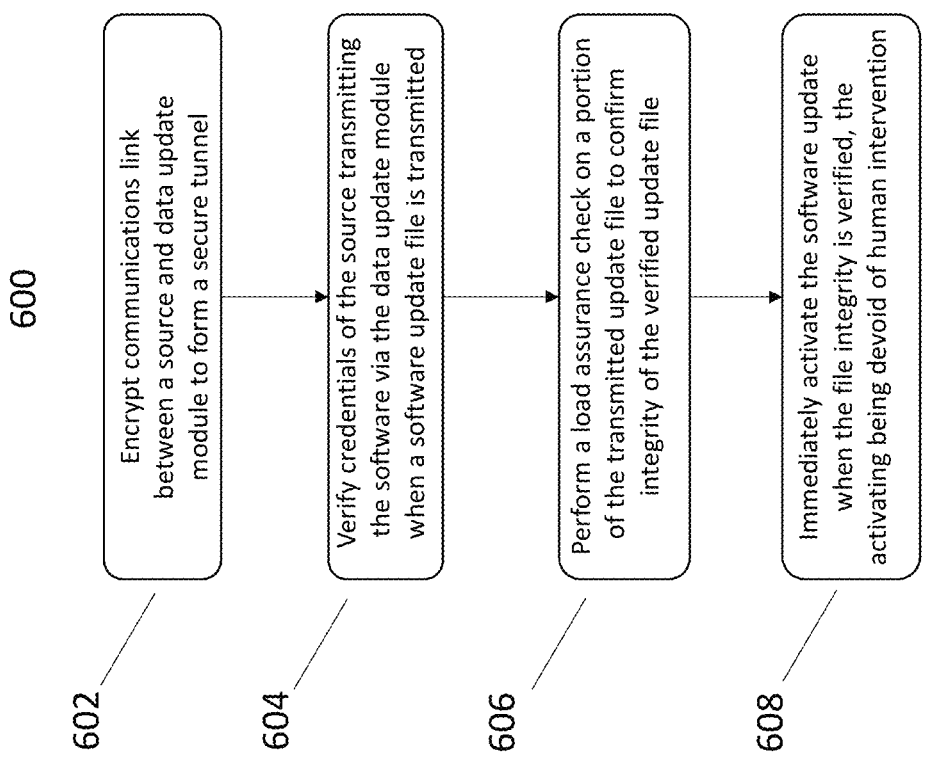
FIG. 6 illustrates a flow chart of an exemplary method of practicing an embodiment of the present invention.

FIG. 6 illustrates a flow chart of an exemplary method 600 of practicing an embodiment of the present invention. In FIG. 6, the method 600 begins with step 602 where the communication link between the ground systems and the data module is encrypted to form a secure tunnel. In step 604, the data update module verifies the credentials of the source transmitting the software when an update file is transmitted. A load assurance check is performed on a portion of the transmitted update file to confirm integrity of the verified file, in step 606. The software update is immediately activated in step 608, when the file integrity is verified, wherein the activation is devoid of human intervention.

Figure 7:
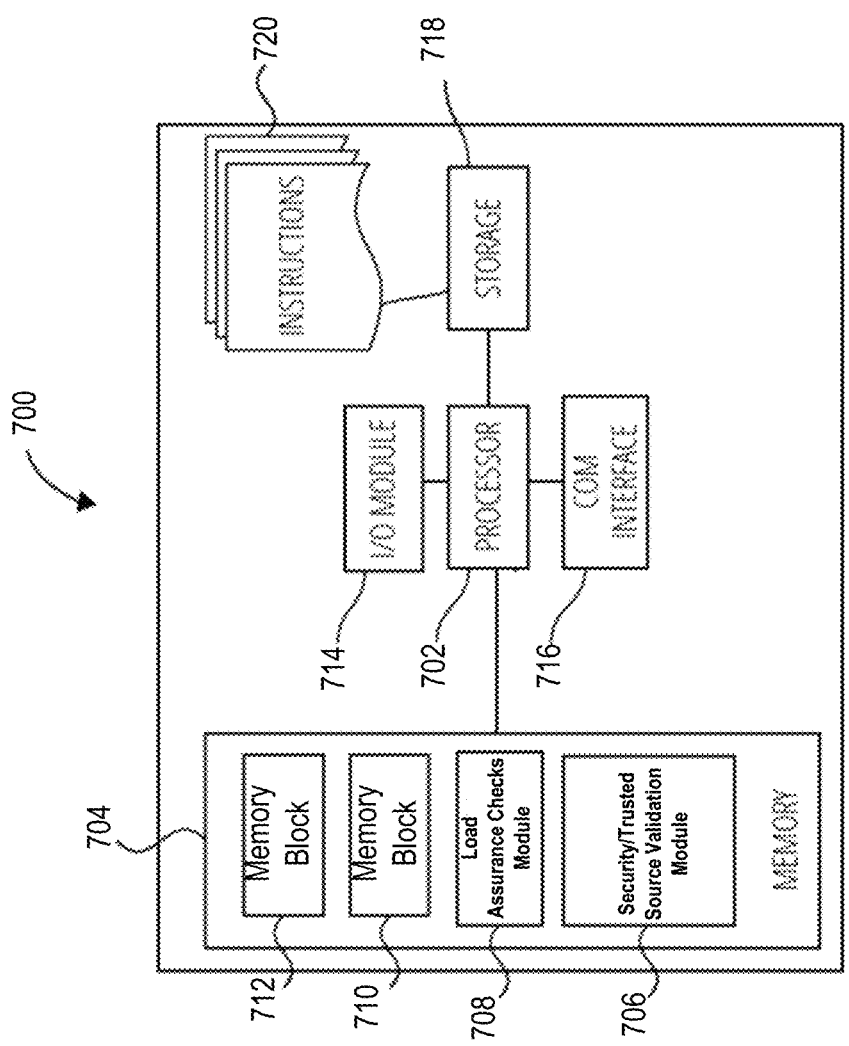
FIG. 7 illustrates an exemplary computer system on which embodiments of the present invention can be implemented.

FIG. 7 illustrates a non-generic computer system 700 on which embodiments of the present invention may be implemented. In particular, the computer system 700 depicts a block diagram of security check logic 302, including a processor 702 having a specific structure. The specific structure is imparted to the processor 702 by instructions stored in a memory 704 included therein and/or by instructions 720 that can be fetched by the processor 702 from a storage medium 718.

The storage medium 718 may be co-located with the security check logic 302 as shown or can be located elsewhere and be communicatively coupled to the security check logic 302. The security check logic 302 can be a stand-alone programmable system, or it can be a programmable module located in a much larger system. For example, the security check logic 302 may be integrated into, or embedded within the data module 202.

The security check logic 302 may include one or more hardware and/or software components configured to fetch, decode, execute, store, analyze, distribute, evaluate, diagnose, and/or categorize information. Furthermore, the security check logic 302 can include an (input/output) I/O module 714 configured to interface with a plurality of remote devices, such as a driver controller module of a variable frequency drive. The I/O module 714 can also interface with a switch matrix or a by-pass module. In one embodiment, the I/O module can include one or more data acquisition modules.

The processor 702 may include one or more processing devices or cores (not shown). In some embodiments, the processor 702 may be a plurality of processors, each having either one or more cores. The processor 702 can be configured to execute instructions fetched from the memory 704, i.e. from one of memory block 712, memory block 710, load assurance checks module 708, or memory block security/trusted source validation module 706. The instructions can be fetched from storage medium 718, or from a remote device connected to the security check logic 302 via communication interface 716.

Furthermore, without loss of generality, the storage medium 718 and/or the memory 704 may include a volatile or non-volatile, magnetic, semiconductor, tape, optical, removable, non-removable, read-only, random-access, or any type of non-transitory computer-readable computer medium. The storage medium 718 and/or the memory 704 may include programs and/or other information that may be used by the processor 702.

Moreover, the storage medium 718 may be configured to log data processed, recorded, or collected during the operation of the security check logic 302. For example, the storage medium 718 may store historical patterns, predetermined thresholds, for each of the measurable variables associated with the security check logic 302. The data may be time-stamped, location-stamped, cataloged, indexed, or organized in a variety of ways consistent with data storage practice.

In one embodiment, the memory block 706 may be a security/trusted source validation module, and the memory block 708 may be a load assurance checks module. As such, the security check logic 302 may fetch instructions from these modules, which, when executed by the processor 702, cause the processor 702 to perform certain operations.

The operations may include receiving status data from a control unit coupled to the security check logic 302 through a plurality of sensors that terminate the I/O module 714, for example. The operations may further include performing a diagnostic test on the status data, and subsequently instructing a driver of the control unit to alter a control regimen of the control unit based on results of the diagnostics test. The instructions can be sent though the communication interface 716, for example.

The status data may include measured data associated with at least one of a temperature of one avionics system sensed by the control unit, a vibrational signature of another avionics system, and an insulation integrity of a third related system. The diagnostic test may include comparing the status data with either a historical pattern or a predetermined threshold, or both, based on information stored in the storage medium 718.

Figure 8:
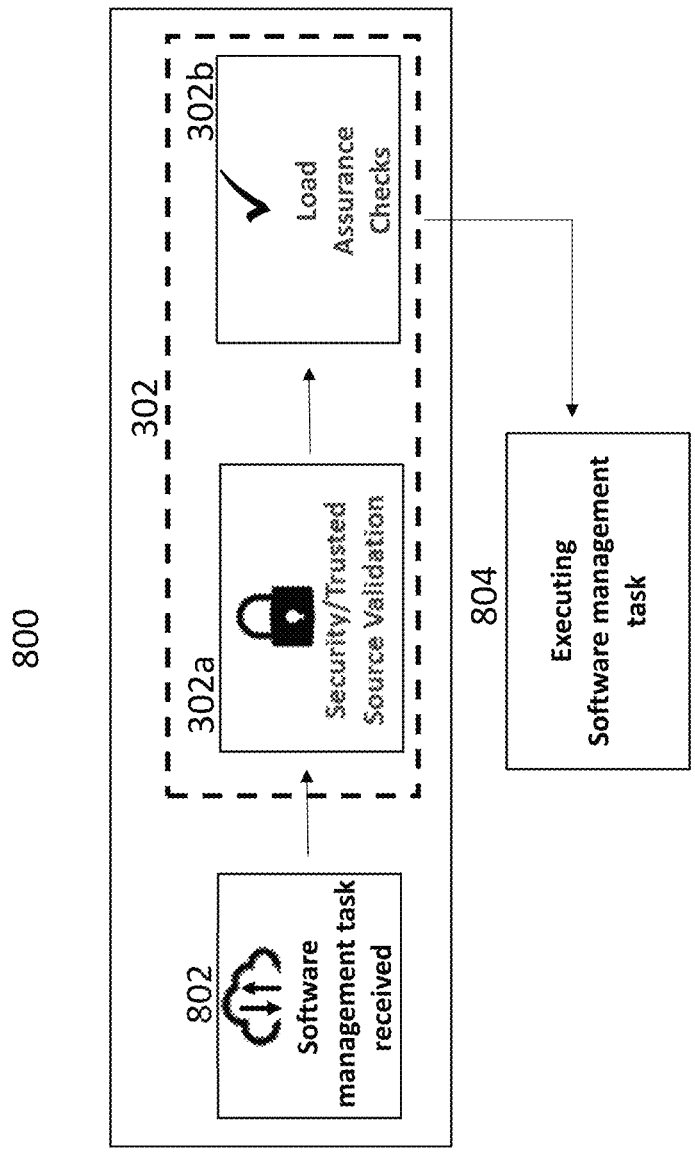
FIG. 8 illustrates an exemplary software management module constructed in accordance with an alternative embodiment of the present invention.

FIG. 8 illustrates an exemplary software management module 800 constructed in accordance with the embodiments. Elements (h)-(k) below are a few examples of software management tasks capable of being performed via the software management module 800 in accordance with the embodiments. These tasks are addressed in greater detail herein in relation to FIGS. 8-10:

h. remote query of system of what apps are currently running;
i. equipment self-reporting of updates/changes;
j. live configuration/creation of reports; and
k. configurable level of error reports and log files sent automatically at connection.

In the embodiments, when a software management task is communicated, for example, tasks (h)-(k) above, the communication is received as an input to the software management module 800, as verified by the software management task received logic step 802. If the source (i.e., the human operator 204) of the task passes proper security checks and is verified, the software management task step 802 is security verified and validated at the security check logic 302. The security check logic 302 in the software management module 800 is identical to, and described in detail with reference to, the data update module 202 illustrated in FIG. 3. Therefore, details of the security check logic 302 will not be repeated here.

Elements (h)-(k), addressed in additional detail below, are non-limiting examples of tasks capable of being performed by the software management module 800.

In one illustrious example, the software management module 800 is a mechanism for a ground system, either automatically or upon request by a user via the various wireless communications mediums discussed above, to send a message (i.e. a communication) to an airplane, such as the airplane 100. The message may request information related to aircraft software applications. In the exemplary embodiment of FIG. 8, the software management module 800 includes computer logic to perform the steps of receiving an initial software management task 802, to execute security check logic 302, and execute the software management task at logic step 804.

The software management module 800 can also be configured to provide a variety of different types of self-reporting of software updates, and/or programming changes. That is, when any software or programming changes occur to user selectable applications (e.g., functions or dials) on user selectable systems, the software management module 800 can provide a status report. For example, when software updates are received (e.g., via the software update module 202), and/or when software is activated/deactivated, the software management module 800 will periodically send a type of status report, or alert, to the user or ground system. The status report or alert conveys status of the software application (i.e. what software is loaded, what has been updated, what has been activated/deactivated etc.).

In one instance, a user may request a report on software or flight programming changes to a specific LRU or LRU function. In other instances, the user may request to know these changes in real-time, or while the airplane 100 is in-flight. Different users may have different rules for self-reporting for different systems. Thus, the software management module 800 can be preset or reconfigurable to accommodate these different rules.

In yet another exemplary embodiment, the software management module 800 facilitates production or creation of live configuration reports. That is, the airplane 100, via the software management module 800, has the ability to communicate in-flight with a user, or a ground system by creating reports containing measured data (e.g., collected from a sensor), or processed data (i.e., resulting from calculations performed on measured data). The processed data can also result from a human's input to the measured data, such as an input from a flight crew.

The airplane 100 can bundle this live information into a near real-time report and provide the report to the user or the ground system while the airplane 100 is still in flight. In one example, the airplane 100 can be configured to begin providing these real-time reports when the user, or the ground system, suspects there may be an equipment malfunction. That is, one or more systems on the airplane 100, via the software management module 800, can be instructed (e.g., via an activation command) to begin recording data associated with selected parameters, while in flight. Alternatively, these features could be activated while the airplane 100 is on the ground. In one ground example, the airplane 100 could be a gate or hanger with the avionics powered up, but the engines shut down.

The software management module 800 provides a configurable level of error reports and log files sent automatically at connection to a wireless network. As discussed above, the software management module 800 establishes network connections through various mediums including cellular, Wi-Fi, Satcom, etc. These network connections produce various status and network communication metrics related to the quality of the network connection.

For example, various metrics relate to the presence of errors connecting to the ground system; in which particular communication channel errors are present; whether the system itself is error-free; which applications are running correctly, etc. The software management module 800 is configurable for selecting an appropriate type and level of these files and sending them to the user or to the ground system and a particular time. Alternatively, all of the reports can be communicated at the earliest opportunity or placed on hold until later, based on a programmable selectable operational status.

Figure 9:
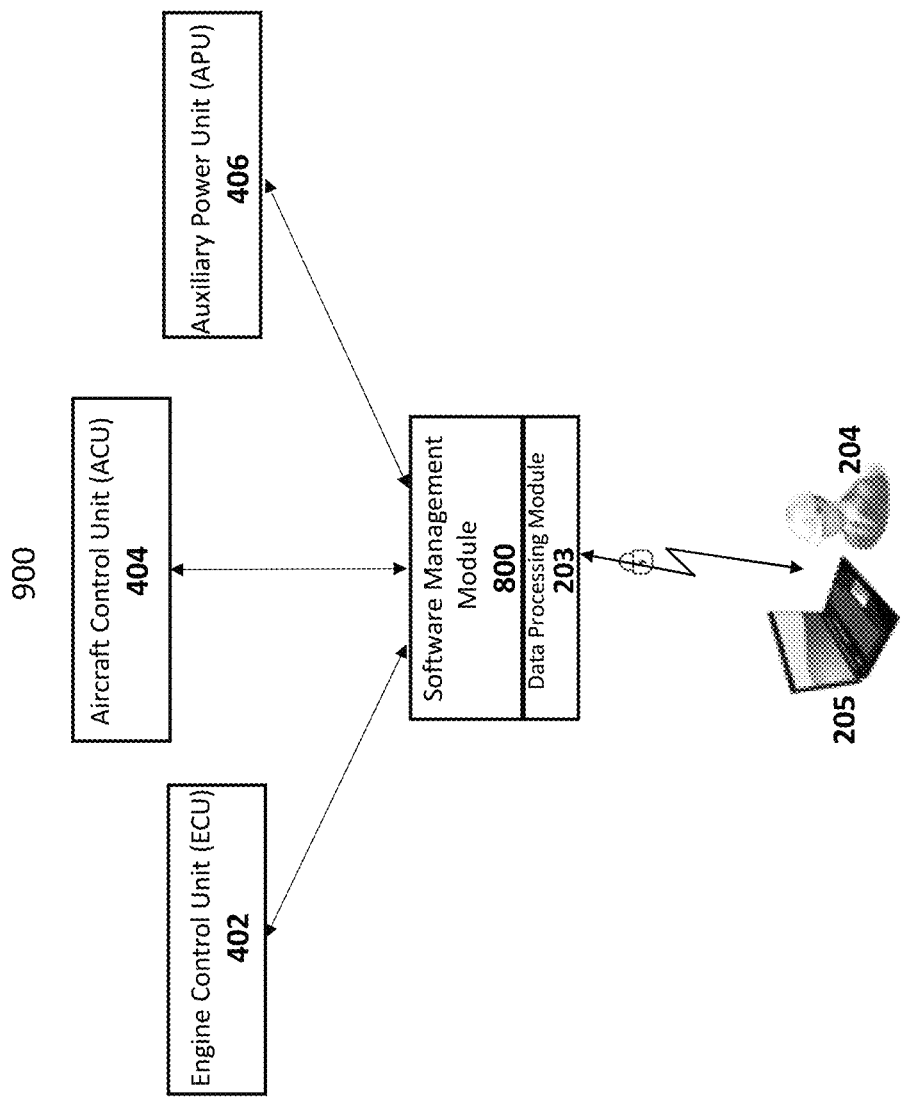
FIG. 9 illustrates an exemplary deployment of an embodiment of a single software management of the present invention in a hub configuration servicing one or more aircraft systems.

FIG. 9 illustrates a deployment 900 of an embodiment of a single software management module 800 of the present invention in a hub configuration servicing one or more aircraft systems, similar to FIG. 4 above. In FIG. 9, as in FIG. 4 above, the human operator 204, using the laptop computer 205, transmits a software management task via a secure encrypted connection to software management module 800 (on the aircraft 100). In this example, the software management module 800 acts as a single hub, front-end, or pathway for all software management tasks sent to each of the ECU 402, the ACU 404 and the APU 406.

The software management module 800, however, is not limited to the hub configuration of FIG. 9 and may be used in alternative deployment scenarios. Deployment 500, depicted in FIG. 5 above, is one such alternative deployment scenario.

Figure 10:
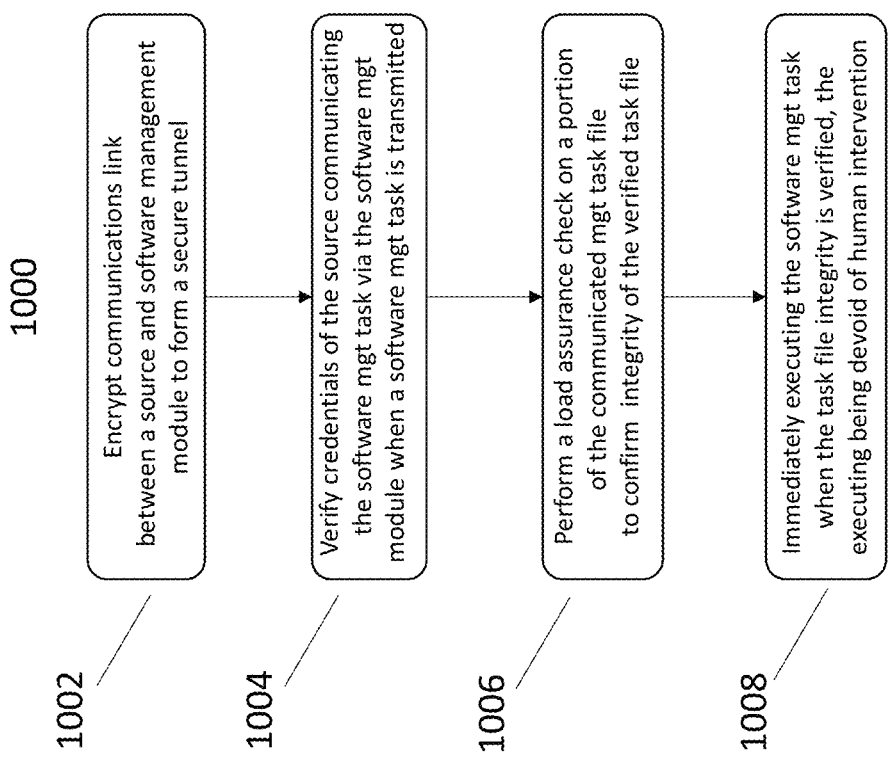
FIG. 10 illustrates a method of practicing an alternative embodiment of the present invention.

FIG. 10 illustrates a flow chart of an exemplary method 1000 of practicing an alternative embodiment of the present invention. In FIG. 10, the method 1000 begins with step 1002 where the communication link between the ground systems and the software management module is encrypted to form a secure tunnel. In step 1004, the software management module verifies the credentials of the source communicating the software management task when software management task file is transmitted. A load assurance check is performed on a portion of the communicated management task file to confirm integrity of the verified file, in step 1006. The software management task is immediately executed in step 1008 when the file integrity is verified, wherein the execution is devoid of human intervention.

Those skilled in the relevant art(s) will appreciate that various adaptations and modifications of the embodiments described above can be configured without departing from the scope and spirit of the disclosure. Therefore, it is to be understood that, within the scope of the appended claims, the teachings set forth in the present disclosure may be practiced other than as specifically described herein.

What is claimed is:

1. A method for remotely communicating a software management task to certified software from a source to a software management module on an asset via a wireless communications link, the method comprising:
   encrypting the wireless communications link between the source and the software management module to form a secure tunnel;
   verifying credentials of the source via the software management module when a software management task file is communicated, wherein the software management task file includes executable software and the verifying is devoid of human intervention;
   performing a load assurance check on a portion of the communicated software management task file to confirm an integrity of the communicated software management task file when the credentials of the source are verified, the performing being devoid of human intervention; and
   immediately executing the communicated software management task when the file integrity is verified, the executing being devoid of human intervention.

2. The method of claim 1, wherein the source is a ground unit.

3. The method of claim 1, wherein the verifying includes security/trusted source validation.

4. The method of claim 1, wherein at least one software management module performs security checking for all aircraft critical function control modules or data processing unit.

5. The method of claim 1, wherein each software management module forms a path to only one corresponding aircraft critical function control module or data processing unit.

6. The method of claim 1, wherein the load assurance check includes at least one of a check-sum and a hash function.

7. The method of claim 1, further comprising sending a validation message from the software management module notifying the source of a final disposition of the software management task.

8. The method of claim 1, wherein the executing includes at least one of querying currently running applications, remotely activating/deactivating applications, and providing self-reporting of updates/changes to equipment.

9. A tangible computer-readable medium having stored thereon, computer executable instructions that, if executed by a computing device, cause the computing device to perform a method for remotely communicating a software management task to certified software from a source to a software management module on an asset via a wireless communications link comprising:
   encrypting the wireless communications link between the source and the software management module to form a secure tunnel;
   verifying credentials of the source via the software management module when a software management task file is communicated, the software management task file including executable software and the verifying being devoid of human intervention;
   performing a load assurance check on a portion of the communicated software management task file to confirm an integrity of the communicated software management task file when the credentials of the source are verified, the performing being devoid of human intervention; and
   immediately executing the communicated software management task when the file integrity is verified, the executing being devoid of human intervention.

10. The tangible computer-readable medium of claim 9, wherein the source is a ground unit.

11. The tangible computer-readable medium of claim 9, wherein the verifying includes security/trusted source validation and load assurance checks.

12. The tangible computer-readable medium of claim 9, wherein at least one software management module performs security checking for all aircraft critical function control modules or data processing units.

13. The tangible computer-readable medium of claim 9, wherein each software management module forms a path to only one corresponding aircraft critical function control module or data processing unit.

14. The tangible computer-readable medium of claim 9, wherein the load assurance check includes at least one of a check-sum and a hash function.

15. The tangible computer-readable medium of claim 9, further comprising sending a validation message from the software management module notifying the source of a final disposition of the software management task.

16. The tangible computer-readable medium of claim 9, wherein the executing includes at least one of querying currently running applications, remotely activating/deactivating applications, and providing self-reporting of updates/changes to equipment.

17. A system for remotely communicating a software management task to certified software from a source to an airplane comprising:
- a software management module configured for placement on the airplane and for receiving a file transmitted from the source representative of the software management task;
- a wireless communications link forming an encrypted tunnel between the source and the software management module on the airplane;
- wherein the software management module is configured to (i) verify credentials of the source when a software management task file is communicated, the software management task file including executable software, and the verifying being devoid of human intervention and (ii) perform a load assurance check on a portion of the communicated software management task file to confirm an integrity of the communicated software management task file when the credentials of the source are verified, the performing being devoid of human intervention; and
- wherein the software management module immediately executes the communicated software management task when the file integrity is verified, the executing being devoid of human intervention.

18. The system of claim 17, wherein the source is a ground unit.

19. The system of claim 17, wherein the verifying includes security/trusted source validation.

20. The system of claim 17, wherein the load assurance check includes at least one of a check-sum and a hash function.

* * * * *